US012592387B2

(12) United States Patent
Wang et al.

(10) Patent No.: US 12,592,387 B2
(45) Date of Patent: Mar. 31, 2026

(54) NON-AQUEOUS ELECTROLYTE SECONDARY BATTERY

(71) Applicant: SANYO Electric Co., Ltd., Kadoma (JP)

(72) Inventors: Na Wang, Hyogo (JP); Daisuke Ikeda, Hyogo (JP); Kentaro Takahashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 687 days.

(21) Appl. No.: 17/771,280

(22) PCT Filed: Oct. 19, 2020

(86) PCT No.: PCT/JP2020/039213
§ 371 (c)(1),
(2) Date: Apr. 22, 2022

(87) PCT Pub. No.: WO2021/085201
PCT Pub. Date: May 6, 2021

(65) Prior Publication Data
US 2022/0376258 A1     Nov. 24, 2022

(30) Foreign Application Priority Data

Oct. 31, 2019    (JP) ................................. 2019-198656

(51) Int. Cl.
*H01M 4/62*        (2006.01)
*H01M 4/133*       (2010.01)
(Continued)

(52) U.S. Cl.
CPC ........... *H01M 4/622* (2013.01); *H01M 4/133* (2013.01); *H01M 4/583* (2013.01);
(Continued)

(58) Field of Classification Search
CPC ...... H01M 4/622; H01M 4/133; H01M 4/583; H01M 10/0587; H01M 2004/021;
(Continued)

(56) References Cited

U.S. PATENT DOCUMENTS

| | | | | |
|---|---|---|---|---|
| 2006/0073387 A1* | 4/2006 | Sakagoshi | ............. | H01M 4/622 |
| | | | | 252/182.1 |
| 2008/0199777 A1 | 8/2008 | Onishi et al. | | |

(Continued)

FOREIGN PATENT DOCUMENTS

| | | | | | |
|---|---|---|---|---|---|
| CN | 109585781 A | * | 4/2019 | ........ | H01M 10/0525 |
| CN | 109616613 A | * | 4/2019 | ............ | H01M 4/505 |

(Continued)

OTHER PUBLICATIONS

Office Action dated Mar. 29, 2024, issued in counterpart CN application No. 202080074885.3, with English translation. (16 pages).

(Continued)

*Primary Examiner* — Kaity V Chandler
(74) *Attorney, Agent, or Firm* — WHDA, LLP

(57)        ABSTRACT

This non-aqueous electrolyte secondary battery is provided with: an electrode body that has a positive electrode and a negative electrode; and an outer package in which the electrode body is accommodated. The negative electrode comprises a negative electrode core body and a negative electrode mixture layer formed on the surface of the nega-tive electrode core body. The negative electrode mixture layer comprises: a negative electrode active material that has a tap density of 1.00-1.20 g/cm³; CMC, the content of which accounts for 0.6-0.8 mass % in the negative electrode mixture layer; and SBR, the content of which accounts for 0.4-0.8 mass % in the negative electrode mixture layer. The mass ratio of the content of CMC to the content of SBR in (Continued)

the negative electrode mixture layer is less than 2, and the total content of CMC and SBR in the negative electrode mixture layer is less than 1.5 mass %.

9 Claims, 1 Drawing Sheet

(51) Int. Cl.
    *H01M 4/583*       (2010.01)
    *H01M 10/0587*    (2010.01)
    *H01M 4/02*       (2006.01)

(52) U.S. Cl.
    CPC .. *H01M 10/0587* (2013.01); *H01M 2004/021* (2013.01); *H01M 2004/027* (2013.01)

(58) Field of Classification Search
    CPC ....... H01M 2004/027; H01M 10/0431; H01M 10/0525; H01M 4/587; H01M 10/052; H01M 4/131; H01M 4/134; H01M 4/386; H01M 4/387; H01M 4/485; H01M 4/505; H01M 4/525; H01M 4/62; H01M 10/058
    See application file for complete search history.

(56)               References Cited

U.S. PATENT DOCUMENTS

| | | |
|---|---|---|
| 2011/0193014 A1 | 8/2011 | Sotowa et al. |
| 2013/0224598 A1 | 8/2013 | Kameda et al. |
| 2014/0212750 A1 | 7/2014 | Ahn et al. |
| 2014/0272540 A1 | 9/2014 | Takahata et al. |
| 2019/0267618 A1 * | 8/2019 | Kanetake ............ H01M 10/056 |
| 2021/0135220 A1 | 5/2021 | Isaka et al. |

FOREIGN PATENT DOCUMENTS

| | | | | |
|---|---|---|---|---|
| CN | 111293360 A | * | 6/2020 | ........ H01M 10/0567 |
| JP | 2005-222933 A | | 8/2005 | |
| JP | 2011-238622 A | | 11/2011 | |
| JP | 2012-94505 A | | 5/2012 | |
| JP | 2014-528631 A | | 10/2014 | |
| JP | 2015220173 A | | 12/2015 | |
| JP | 2019-145347 A | | 8/2019 | |
| KR | 20170062908 A | * | 6/2017 | ............ H01M 4/133 |
| KR | 20200105228 A | * | 9/2020 | ............ H01M 4/587 |
| WO | 2013/054398 A1 | | 4/2013 | |
| WO | 2018/207896 A1 | | 11/2018 | |
| WO | WO-2019167611 A1 | * | 9/2019 | ........ H01M 10/0525 |
| WO | WO-2020141953 A1 | * | 7/2020 | ............ H01M 4/133 |
| WO | WO-2020158153 A1 | * | 8/2020 | ............ H01M 50/103 |

OTHER PUBLICATIONS

Office Action dated May 21, 2024, issued in counterpart JP application No. 2021-553413, with English translation. (6 pages).
International Search Report dated Jan. 12, 2021, issued in counterpart International Application No. PCT/JP2020/039213 (2 pages).

* cited by examiner

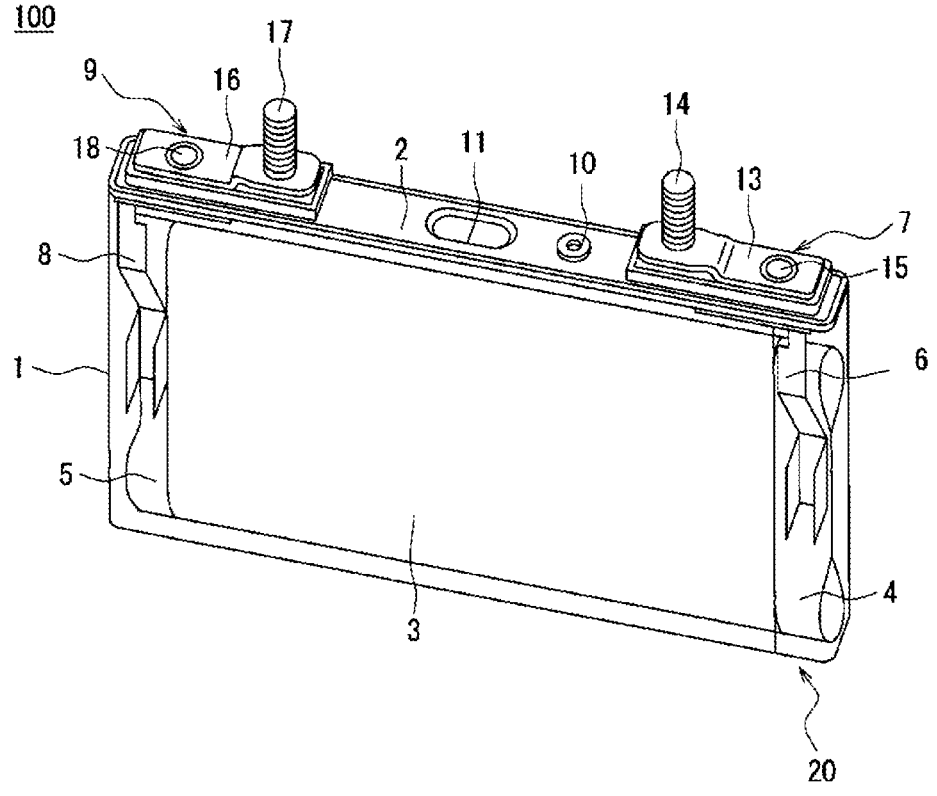

NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/039213 filed on Oct. 19, 2020 which claims the benefit of priorities under 35 U.S.C. § 119(a) of Japanese Patent Application No. 2019-198656 filed in Japan on Oct. 31, 2019, the contents of which are incorporated herein by reference.

TECHNICAL FIELD

The present disclosure relates to a non-aqueous electrolyte secondary battery.

BACKGROUND

A negative electrode mixture layer constituting a negative electrode of a non-aqueous electrolyte secondary battery includes a negative electrode active material, a thickener, and a binder, and as the negative electrode active material, a carbon material such as graphite is widely used. By adjusting the characteristics and content of each of the negative electrode active material, the thickener, and the binder, various characteristics of the secondary battery can be changed.

For example, Patent Literature 1 discloses a secondary battery in which the cycle characteristic is improved by configuring the negative electrode mixture layer to include natural graphite having a degree of amorphization of 0.3 to 0.5 as determined by Raman measurement as the negative electrode active material, CMC in an amount of 1% by mass to 2% by mass as the thickener, and SBR in an amount of 1% by mass to 2% by mass as the binder.

Further, Patent Literature 2 discloses a secondary battery in which the cycle characteristic is improved by configuring the negative electrode mixture layer to include natural graphite having a tap density of $0.7$ g/cm$^3$ or higher, CMC in an amount of 1% by mass or more, and SBR in an amount of 1% by mass or more.

Further, Patent Literature 3 discloses a secondary battery in which the high-speed charge/discharge characteristic is improved by configuring the negative electrode mixture layer to include graphite having a specific surface area of 1 m$^2$/g or larger, CMC in an amount of 0.3% by mass to 3% by mass, SBR in an amount of 0.3% by mass to 5% by mass, and carbon fiber having a fiber diameter of 1 nm to 1000 nm as a conductive material.

CITATION LIST

Patent Literature

PATENT LITERATURE 1: Japanese Unexamined Patent Application Publication No. 2014-528631
PATENT LITERATURE 2: Japanese Unexamined Patent Application Publication No. 2011-238622
PATENT LITERATURE Japanese Unexamined Patent Application Publication No. 2005-222933

SUMMARY

In a battery assembly process, during cutting of a negative electrode to a certain size, a part of the mixture of the negative electrode mixture layer may break off and drop down. If the dropped mixture is wound into the battery, an internal short circuit may occur during charging/discharging of the battery. In addition, since the portion of the negative electrode mixture layer from which the mixture has dropped becomes brittle, further parts of the mixture may break off and drop due to expansion and contraction of the mixture layer during charging/discharging of the battery, and this may result in further internal short circuits. Accordingly, in order to improve reliability of the battery, it is necessary to suppress breaking off and dropping of the negative electrode mixture. Further, when the secondary battery is to be used as a power source for an electric vehicle (EV) or the like, excellent low-temperature regeneration characteristic is required. However, in Patent Literature 1 to 3, the amount of negative electrode mixture dropped during cutting of the negative electrode and the low-temperature regeneration characteristic are not taken into consideration.

A non-aqueous electrolyte secondary battery according to one aspect of the present disclosure includes an electrode assembly having a positive electrode and a negative electrode, and an outer casing that houses the electrode assembly. The negative electrode includes a negative electrode core and a negative electrode mixture layer formed on a surface of the negative electrode core. The negative electrode mixture layer contains a negative electrode active material having a tap density of $1.00$ g/cm$^3$ to $1.20$ g/cm$^3$, CMC at a content of 0.6% by mass to 0.8% by mass in the negative electrode mixture layer, and SBR at a content of 0.4% by mass to 0.8% by mass in the negative electrode mixture layer. The mass ratio of the CMC content to the SBR content in the negative electrode mixture layer is smaller than 2, and the total content of the CMC and the SBR in the negative electrode mixture layer is less than 1.5% by mass.

According to a non-aqueous electrolyte secondary battery according to the present disclosure, reliability and low-temperature regeneration characteristic of the battery can be improved.

BRIEF DESCRIPTION OF DRAWINGS

FIG. 1 is a perspective view of a secondary battery according to an example embodiment, and shows a structure inside a battery housing with a front side of an outer casing removed.

DESCRIPTION OF EMBODIMENTS

By increasing the tap density of the negative electrode active material contained in the negative electrode mixture layer, the liquid absorption path by which the electrolyte solution travels from the surface of the negative electrode mixture layer to the negative electrode core is shortened, so that the low-temperature regeneration characteristic is improved. However, since a negative electrode active material having a high tap density has a high circularity, when a negative electrode active material having a high tap density is contained in the negative electrode mixture layer, voids between active material particles are large as compared to a case in which a negative electrode active material having a low tap density is contained, and accordingly, free CMC particles that are not adsorbed on the surface of the negative electrode active material are present in an increased amount, so that the negative electrode becomes stiff. When the negative electrode becomes stiff, parts of the negative electrode mixture containing the negative electrode active material tend to break off and drop during cutting of the negative electrode to a certain size in the battery assembly process, so that it is preferable that the CMC content is low. However, when the CMC content is too low, dispersibility of the negative electrode mixture slurry is degraded, and the negative electrode mixture layer cannot be formed. Here, since SBR has flexibility, the negative electrode can be softened by increasing the SBR content in the negative electrode mixture layer. When the total content of CMC and SBR in the negative electrode mixture layer is increased, the negative electrode can be softened to suppress breaking off and dropping of the negative electrode mixture containing the negative electrode active material, but the resistance of the battery increases, and the low-temperature regeneration characteristic degrades. As a result of diligent studies by the present inventors, it was found that, by mixing CMC and SBR in a predetermined ratio with a negative electrode active material having a high tap density of $1.00$ $g/cm^3$ to $1.20$ $g/cm^3$, the low-temperature regeneration characteristic of the battery can be improved while reducing the amount of the negative electrode mixture that breaks off and drops during cutting of the negative electrode in the battery assembly process (hereinafter referred to as the "amount dropped in cutting").

An example embodiment of the present disclosure will now be described in detail. Although a secondary battery 100 having a rectangular metal outer casing 1 is illustrated as an example in the present embodiment, the shape of the outer casing is not limited to a rectangular shape, and may be, for example, a cylindrical shape or the like. Further, although a spiral-type electrode assembly 3 in which a positive electrode and a negative electrode are wound with separators located between the electrodes is illustrated as an example, the electrode assembly may be of a laminated type formed by alternately laminating a plurality of positive electrodes and a plurality of negative electrodes one by one via separators. The electrode assembly 3 is preferably of a spiral type. Further, although a case in which the mixture layer in each of the positive and negative electrodes is formed on both sides of the core is illustrated as an example, the present disclosure is not limited to a case in which each core has mixture layers formed on both sides, and it is sufficient so long as the core has a mixture layer formed on at least one surface.

As illustrated for example in FIG. 1, the secondary battery 100 comprises: a spiral-type electrode assembly 3 in which a positive electrode and a negative electrode are wound with separators located between the electrodes and are formed into a flat shape having a flat part and a pair of curved parts; an electrolyte; and an outer casing 1 that houses the electrode assembly 3 and the electrolyte. Both of the outer casing 1 and a sealing plate 2 are made of metal, and are preferably made of aluminum or an aluminum alloy.

The outer casing 1 has a bottom portion having a substantially rectangular shape as viewed from the bottom face, and a side wall portion erected on the peripheral edge of the bottom portion. The side wall is formed perpendicular to the bottom portion. The dimensions of the outer casing 1 are not particularly limited, but as an example, the outer casing 1 has a lateral length of 60 to 160 mm, a height of 60 to 100 mm, and a thickness of 10 to 40 mm.

The positive electrode is an elongate member which comprises a positive electrode core made of metal and positive electrode mixture layers formed on both sides of the core, and in which, at one end in the crosswise direction and along the lengthwise direction, the positive electrode core is exposed to form a strip-shaped positive electrode core exposed portion 4. Similarly, the negative electrode is an elongate member which comprises a negative electrode core made of metal and negative electrode mixture layers formed on both sides of the core, and in which, at one end in the crosswise direction and along the lengthwise direction, the negative electrode core is exposed to form a strip-shaped negative electrode core exposed portion 5. The electrode assembly 3 has a structure in which the positive electrode and the negative electrode are wound with separators located between the electrodes, with the positive electrode core exposed portion 4 of the positive electrode being arranged on one end side in the axial direction and the negative electrode core exposed portion 5 of the negative electrode being arranged on the other end side in the axial direction.

A positive electrode current collector 6 is connected to a laminated part of the positive electrode core exposed portion 4 of the positive electrode, and a negative electrode current collector 8 is connected to a laminated part of the negative electrode core exposed portion 5 of the negative electrode. A preferred positive electrode current collector 6 is made of aluminum or an aluminum alloy. A preferred negative electrode current collector 8 is made of copper or a copper alloy. A positive electrode terminal 7 comprises a positive electrode external conductive portion 13 arranged on the battery outer side of the sealing plate 2, a positive electrode bolt portion 14 connected to the positive electrode external conductive portion 13, and a positive electrode insertion portion 15 inserted into a through hole provided in the sealing plate 2, and the positive electrode terminal 7 is electrically connected to the positive electrode current collector 6. Further, a negative electrode terminal 9 comprises a negative electrode external conductive portion 16 arranged on the battery miter side of the sealing plate 2, a negative electrode bolt portion 17 connected to the negative electrode external conductive portion 16, and a negative electrode insertion portion 18 inserted into a through hole provided in the sealing plate 2, and the negative electrode terminal 9 is electrically connected to the negative electrode current collector 8.

The positive electrode terminal 7 and the positive electrode current collector 6 are fixed to the sealing plate 2 via an internal insulating member and an external insulating member, respectively. The internal insulating member is arranged between the sealing plate 2 and the positive electrode current collector 6, and the external insulating member is arranged between the sealing plate 2 and the positive electrode terminal 7. Similarly, the negative electrode terminal 9 and the negative electrode current collector 8 are fixed to the sealing plate 2 via an internal insulating member and an external insulating member, respectively. The internal insulating member is arranged between the sealing plate 2 and the negative electrode current collector 8, and the external insulating member is arranged between the sealing plate 2 and the negative electrode terminal 9.

The electrode assembly 3 is housed in the outer casing 1. The sealing plate 2 is connected to the opening edge part of the outer casing 1 by laser welding or the like. The sealing plate 2 has an electrolyte infection port 10, and this electrolyte infection port 10 is sealed with a sealing plug after the electrolyte is injected into the outer casing 1. The sealing plate 2 has formed therein a gas discharge valve 11 for discharging gas when pressure inside the battery becomes a predetermined value or higher.

The electrolyte is a non-aqueous electrolyte containing a non-aqueous solvent and an electrolyte salt dissolved in the non-aqueous solvent. As the non-aqueous solvent, for example, carbonates, lactones, ethers, ketones, esters, and the like can be used, and two or more of these solvents can be mixed and used. When mixing and using two or more kinds of solvents, it is preferable to use a mixed solvent containing a cyclic carbonate and a chain carbonate. For example, ethylene carbonate (EC), propylene carbonate (PC), butylene carbonate (BC), and the like can be used as the cyclic carbonate, and dimethyl carbonate (DMC), ethyl methyl carbonate (EMC), diethyl carbonate (DEC), and the like can be used as the chain carbonate. The non-aqueous solvent may contain a halogen-substituted product obtained by substituting at least a part of the hydrogens in the above solvents with halogen atoms such as fluorine. As the electrolyte salt, $LiPF_6$, $LiBF_4$, $LiCF_3SO_3$, and the like and mixtures thereof can be used. The amount of the electrolyte salt dissolved in the non-aqueous solvent can be, for example, 0.5 to 2.0 mol/L. Further, an additive such as vinylene carbonate (VC) can be added as appropriate. The electrolyte is not limited to a liquid electrolyte, and may be a solid electrolyte that uses a gel polymer or the like.

Detailed descriptions will now be given regarding the positive electrode, the negative electrode, and the separator constituting the electrode assembly 3, and in particular regarding the negative electrode mixture layer constituting the negative electrode.

[Positive Electrode]

The positive electrode comprises a positive electrode core and a positive electrode mixture layer formed on a surface of the positive electrode core. For the positive electrode core, it is possible to use, for example: a foil of a metal, such as aluminum, that is stable in the potential range of the positive electrode; a film having such a metal disposed on its surface layer; or the like. The positive electrode mixture layer contains, for example, a positive electrode active material, a binder, a conductive material, and the like. The positive electrode can be produced by, for example, applying a positive electrode mixture slurry containing the positive electrode active material, the binder, the conductive material, and the like onto the positive electrode core, drying the applied slurry to form a positive electrode mixture layer, and then rolling this positive electrode mixture layer.

Examples of the positive electrode active material include lithium transition metal oxides containing transition metal elements such as Co, Mn, and Ni. Lithium transition metal oxides are, for example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (where M is at least one of Na, Mg, Sc, Y, Mn, Fe, Co, Ni, Cu, Zn, Al, Cr, Pb, Sb, and B, $0<x≤1.2$, $0<y≤0.9$, and $2.0≤z≤2.3$). The foregoing may be used alone or by mixing a plurality thereof. In terms of enabling an increase in the capacity of the secondary battery 100, the positive electrode active material preferably contains a lithium-nickel composite oxide such as $Li_xNiO_2$, $Li_xCo_yNi_{1-y}O_2$, $Li_xNi_{1-y}M_yO_z$ (where M is at least one of Na, Mg, Sc, Y, Mn, Fe, Co, Ni, Cu, Zn, Al, Cr, Pb, Sb, and B, $0<x≤1.2$, $0<y≤0.9$, and $2.0≤z≤2.3$), and the like.

Examples of the conductive material include carbon-based particles such as carbon black (CB), acetylene black (AB), Ketjen black, and graphite. These may be used alone or by combining two or more thereof.

Examples of the binder include fluororesins such as polytetrafluoroethylene (PTFE) and polvinylidene fluoride (PVdF), polyacrylonitrile (PAN), polyimide resins, acrylic resins, and polyolefin resins. These may be used alone or by combining two or more thereof.

[Negative Electrode]

The negative electrode comprises a negative electrode core and a negative electrode mixture layer formed on a surface of the negative electrode core. For the negative electrode core, it is possible to use, for example: a foil of a metal, such as copper, that is stable in the potential range of the negative electrode; a film having such a metal disposed on its surface layer; or the like. The negative electrode mixture layer contains a negative electrode active material having a tap density of $1.00 \text{ g/cm}^3$ to $1.20 \text{ g/cm}^3$, CMC at a content of 0.6% by mass to 0.8% by mass in the negative electrode mixture layer, and SBR at a content of 0.4 by mass to 0.8% by mass in the negative electrode mixture layer. Further, the mass ratio of the CMC content to the SBR content in the negative electrode mixture layer is smaller than 2, and the total content of the CMC and the SBR in the negative electrode mixture layer is less than 1.5% by mass. With these features, the low-temperature regeneration characteristic of the battery can be improved while reducing the amount dropped in cutting. The negative electrode can be produced by applying a negative electrode mixture slurry containing at least the negative electrode active material, CMC, and SBR onto the negative electrode core, drying the applied slurry to form a negative electrode mixture layer, and then rolling this negative electrode mixture layer.

The negative electrode active material is not particularly limited so long as it can reversibly occlude and release lithium ions. As the negative electrode active material, it is possible to use, for example, a carbon material such as natural graphite or artificial graphite, a metal that forms an alloy with lithium such as silicon (Si) or tin (Sn), an alloy or composite oxide containing a metal element such as Si or Sn, or the like. As the negative electrode active material, a carbon material is preferable, and natural graphite is more preferable. The negative electrode active material may be used alone or by combining two or more thereof.

The negative electrode active material may have a substantially spherical shape having an average circularity of 0.8 or greater. With this feature, the liquid absorption path by which the electrolyte solution travels from the surface of the negative electrode mixture layer to the negative electrode core is shortened, so that the low-temperature regeneration characteristic is improved. In the present specification, an average circularity is defined by $4\pi S/L^2$, where S denotes the projected area of the negative electrode active material particles and L denotes the peripheral length thereof. The circularity of a circle is 1, and the circularity becomes smaller than 1 as the shape becomes elongate. An average circularity is an average value of circularity calculated by observing 100 negative electrode active material particles using a scanning electron microscope and by measuring the area S and the peripheral length L of the active material particles using an image analysis software (for example, ImageJ manufactured by the US National Institutes of Health).

The average particle size of the negative electrode active material may be 8 μm to 13 μm. By having the average particle size and the average circularity of the negative electrode active material within the specified ranges, the tap density of the negative electrode active material can be set in the range of $1.00 \text{ g/cm}^3$ to $1.20 \text{ g/cm}^3$. In the present specification, an average particle size of the negative electrode active material signifies a volume-based median diameter (D50). D50 means a particle size at which, in a volume-based particle size distribution, the cumulative frequency from the smaller particle size side is 50%, and is also called a mid-level diameter. The particle size distribution of the negative electrode active material can be measured by means of a laser diffraction type particle size distribution measuring device (for example, SALD-2200 manufactured by Shimadzu Corporation) and by using an aqueous solution of a surfactant as a dispersion medium.

The tap density of the negative electrode active material is 1.00 g/cm$^3$ to 1.20 g/cm$^3$, preferably 1.03 g/cm$^3$ to 1.18 g/cm$^3$, and more preferably 1.05 g/cm$^3$ to 1.15 g/cm$^3$. When the tap density of the negative electrode active material is increased, the low-temperature regeneration characteristic becomes more improved, but the amount dropped in cutting becomes greater. By setting the tap density of the negative electrode active material within the above-noted range, it is possible to simultaneously achieve an improvement in the low-temperature regeneration characteristic and a reduction in the amount dropped in cutting. The tap density can be determined by placing a connecting filling frame (approximately 50 mL) on a graduated cylinder of a certain volume (for example, 50 mL), introducing 60 g of the negative electrode active material, and after tapping 300 times, removing the filling frame, and calculating based on the mass of the negative electrode active material in the volume of the graduated cylinder. The tap density of the negative electrode active material can be measured using, for example, TVP-1A (constant volume type) manufactured by TSUTSUI SCIENTIFIC INSTRUMENTS CO., LTD.

The oil absorption of the negative electrode active material may be 43 ml/100 g to 52 ml/100 g. An oil absorption can be determined according to the DBP (dibutyl phthalate) Absorption A Method (mechanical method) specified in JIS K-6217-4 "Carbon Black for Rubber Industry, Fundamental Characteristics, Part 4: Determination of DBP Absorption". Here, flaxseed oil is used instead of DBP. Specifically, flaxseed oil is added at a rate of 4 cm$^3$/min to 30 g of negative electrode active material particles being stirred by two blades. The change in viscosity characteristic during that time is detected by a torque detector, and the output is converted into torque by a microcomputer. The amount of flaxseed oil corresponding to the point at Which the torque occurs at 100% of the maximum generated torque is converted into an amount per 100 g of the negative electrode active material particles, and the oil absorption can thereby be determined. The oil absorption of the negative electrode active material can be measured using, for example, an absorption tester (manufactured by ASAHISOUKEN CORPORATION, model name "S-500") or the like.

The BET specific surface area of the negative electrode active material may be 3.5 m$^2$/g to 4.8 m$^2$/g. By setting the BET specific surface area of the negative electrode active material within the above-noted range, the initial discharge capacity of the battery can be improved, and it is also possible to attain a high capacity retention rate after endurance of high-temperature storage. The BET specific surface area can be measured by means of a commercially available measuring device such as HM model-1201 manufactured by Macsorb and by using nitrogen gas.

The CMC content in the negative electrode mixture layer (hereinafter referred to as $C_{CMC}$) is 0.6% by mass to 0.8% by mass. In the present specification, CMC is carboxymethyl cellulose or a salt thereof. Examples of carboxymethyl cellulose salts include sodium carboxymethyl cellulose and ammonium carboxymethyl cellulose. Examples of preferred CMC include carboxymethyl cellulose, sodium carboxymethyl cellulose (CMC-Na), and the like. The CMC may function as a binder, or may, as a thickener, have a function to adjust viscosity of the negative electrode mixture slurry.

The mass average molecular weight of the CMC may be 3.7×10$^5$ to 4.3×10$^5$. By setting the mass average molecular weight of the CMC within this range, the thixotropic property of the negative electrode slurry is enhanced, and ease of application of the mixture slurry to the core can be improved. Further, the hardness of the mixture layer in the electrode plate becomes more appropriate, and the amount dropped in cutting can be suppressed.

The SBR content in the negative electrode mixture layer (hereinafter referred to as $C_{SBR}$) is 0.4% by mass to 0.8% by mass. In the present specification, SBR is styrene-butadiene rubber or a modified product thereof. The average primary particle size of the SBR is preferably 120 to 250 nm, and more preferably 150 to 230 nm.

The Tg of the SBR may be 5° C. or lower. With this feature, the SBR becomes soft, so that the flexibility of the negative electrode can be improved.

In the negative electrode mixture layer, the mass ratio of the CMC content to the SBR content (hereinafter referred to as $C_{CMC}/C_{SBR}$) is smaller than 2, and the total content of the CMC and the SBR (hereinafter referred to as $C_{CMC}+C_{SBR}$) is less than 1.5% by mass. With these features, the low-temperature regeneration characteristic of the battery can be improved while reducing the amount dropped in cutting.

In addition to the CMC and the SBR, the negative electrode mixture layer may contain, within a range that does not hinder the advantageous effects of the present embodiment: a binder such as a fluorine-containing resin such as polytetrafluoroethylene (PTFE) and polyvinylidene fluoride (PVdF), polyacrylonitrile (PAN), polyimide, acrylic resin, or polyolefin; polyacrylic acid (PAA) or a salt thereof; polyvinyl alcohol (PVA); and the like.

The negative electrode mixture layer may have a packing density of 1.05 g/cm$^3$ to 1.25 g/cm$^3$ and a thickness of 65 μm to 75 μm. The packing density and the thickness of the negative electrode mixture layer can be determined by the following method.

(1) Cut out a negative electrode to a size of 10 cm$^2$, and measure the mass A (g) and the thickness C (cm) of the cut-out negative electrode.

(2) Peel off the negative electrode mixture layer from the cut-out negative electrode, and measure the mass B (g) of the negative electrode core and the thickness D (cm) of the core.

(3) Calculate the thickness of the negative electrode mixture layer using the following formula: thickness (μm)=(C−D)×10$^4$.

(4) Calculate the packing density of the negative electrode mixture layer using the following formula: packing density (g/cm$^3$)=(A−B)/[(C−D)×10]

[Separator]

For the separator, for example, a porous sheet having ion permeability and insulating property is used. Specific examples of the porous sheet include a microporous thin film, a woven fabric, and a non-woven fabric. As the material of the separator, olefin resins such as polyethylene and polypropylene, cellulose and the like are preferred. The separator may be a laminate having a cellulose fiber layer and thermoplastic resin fiber layer made of olefin resin or the like. The separator may alternatively be a multilayer separator including a polyethylene layer and a polypropylene layer, and a separator having a surface coated with a material such as aramid resin or ceramic may be used.

EXAMPLES

While the present disclosure will now be described further using Examples, the present disclosure is not limited to these Examples.

Negative Electrode Active Material

Natural graphites were used as the negative electrode active material. The natural graphites used were five types of natural graphites A to E, and Table 1 shows the tap density, average circularity, average particle size (D50), oil absorption, and BET specific surface area of each of those natural graphites.

Production of Electrode Assembly

The above-described positive electrode and the above-described negative electrode were wound with strip-shaped

TABLE 1

|  | Tap Density [g/cm$^3$] | Average Circularity | Average Particle Size (D50) [μm] | Oil Absorption [ml/100 g] | BET Specific Surface Area [m$^2$/g] |
|---|---|---|---|---|---|
| Natural Graphite A | 1.10 | 0.84 | 10.6 | 47.5 | 4.3 |
| Natural Graphite B | 1.03 | 0.81 | 10.3 | 51.3 | 4.3 |
| Natural Graphite C | 1.20 | 0.88 | 11.2 | 43.2 | 4.2 |
| Natural Graphite D | 0.92 | 0.69 | 9.5 | 54.0 | 4.5 |
| Natural Graphite E | 1.30 | 0.93 | 12.2 | 40.0 | 3.9 |

Example 1

Production of Positive Electrode

As the positive electrode active material, a composite oxide represented by $LiNi_{0.35}Ni_{0.35}Co_{0.35}Mn_{0.30}O_2$ was used. The positive electrode active material, PVdF, and carbon black were mixed together at a mass ratio of 90:3:7, and the mixture was kneaded while adding N-methyl-2-pyrrolidone to thereby prepare a positive electrode mixture slurry. Next, the positive electrode mixture slurry was applied to both sides of an elongate positive electrode core made of an aluminum foil having a thickness of 13 μm, and the applied films were dried. The dried applied films were compressed to a packing density of 2.5 g/cm$^3$, and then the product was cut to a predetermined electrode size. A positive electrode having positive electrode mixture layers formed on both sides of the positive electrode core was thereby produced. On the positive electrode, a positive electrode core exposed portion for connecting a positive electrode current collector was provided at one end in the width direction and along the lengthwise direction of the positive electrode.

Production of Negative Electrode

Natural graphite A was used as the negative electrode active material. The negative electrode active material, carboxymethyl cellulose (CMC), and styrene-butadiene rubber (SBR) were mixed together so as to attain a mass ratio of 98.8:0.6:0.6, and an appropriate amount of water was further added thereto to prepare a negative electrode mixture slurry. $C_{CMC}/C_{SBR}$ calculated from the above mixing ratio was 1, and $C_{CMC}+C_{SBR}$ was 1.2% by mass. The mass average molecular weight of the CMC was $4.0×10^5$, and the Tg of the SBR was 1.0° C.

The negative electrode mixture slurry was applied by a die coating method to both sides of a negative electrode core made of a copper foil, and after the applied films were dried, a negative electrode having negative electrode mixture layers formed on both sides of the negative electrode core was produced. The negative electrode mixture layers of the negative electrode were rolled using a roller to a packing density of 1.2 g/cm$^3$ and a thickness of 67 μm, and then the product was cut to a predetermined electrode size. On the negative electrode, a negative electrode core exposed portion for connecting a negative electrode current collector was provided at one end in the width direction and along the lengthwise direction of the negative electrode.

separators having a width of 120 mm located between the electrodes, and the wound product was pressed in the radial direction to be shaped in a flat shape to thereby produce a spiral-type electrode assembly. The wound product was formed by laminating a separator, the positive electrode, a separator, and the negative electrode in that order, and winding this laminate around a cylindrical winding core (here, identical separators were used as the two separators). The positive electrode and the negative electrode were wound so that their respective core exposed portions were located on opposite sides from each other in the axial direction of the wound product. The press conditions of the wound product were such that the press temperature was 75° C., the press pressure was 100 kN, and the press time was 3 minutes.

Preparation of Electrolyte Solution

Into a mixed solvent obtained by mixing ethylene carbonate (EC), ethyl methyl carbonate (EMC), and diethyl carbonate (DEC) at a volume ratio of 3:3:4 (at 25° C. and 1 atm), $LiPF_6$ was added to a concentration of 1 mol/L, and vinylene carbonate was further added to a concentration of 0.3% by mass to thereby prepare an electrolyte solution.

Production of Secondary Battery

A secondary battery (rectangular battery) was produced using the above-described electrode assembly, the above-described electrolyte solution, and a rectangular battery housing. A positive electrode terminal was attached to a sealing plate constituting the battery housing, and a positive electrode current collector was connected to the positive electrode terminal. Further, a negative electrode terminal was attached to the sealing plate, and a negative electrode current collector was connected to the negative electrode terminal. Then, the positive electrode current collector was welded to the core exposed portion of the positive electrode, and the negative electrode current collector was welded to the core exposed portion of the negative electrode. The electrode assembly formed into one unit with the sealing plate was placed inside an insulating sheet shaped into a box shape, and in that state, the electrode assembly was housed in an outer casing constituting the battery housing and having a bottomed rectangular tube shape (with a lateral length of 148.0 mm (the inside dimension being 146.8 mm), a thickness of 17.5 mm (the inside dimension being 16.5 mm), and a height of 65.0 mm (the inside dimension being 64.0 mm)). The opening of the outer casing was then closed with the sealing plate. 65 g of the electrolyte solution was injected therein through an electrolyte solution injection port in the sealing plate, and then after allowing the electrolyte solution to sufficiently soak into the electrode assembly, initial charging was performed, and a sealing plug was attached to the solution injection port. A secondary battery (with a battery capacity of 8 Ah) was thereby obtained.

Example 2

A negative electrode and a secondary battery were obtained in the same manner as in Example 1 except that natural graphite B was used as the negative electrode active material. The obtained negative electrode and secondary battery were used as Example 2.

Example 3

A negative electrode and a secondary battery were obtained in the same manner as in Example 1 except that natural graphite C was used as the negative electrode active material. The obtained negative electrode and secondary battery were used as Example 3.

Example 4

A negative electrode and a secondary battery were obtained in the same manner as in Example 1 except that, in preparing the negative electrode slurry, the negative electrode active material, carboxymethyl cellulose (CMC), and styrene-butadiene rubber (SBR) were mixed together so as to attain a mass ratio of 99.0:0.6:0.4. The obtained negative electrode and secondary battery were used as Example 4.

Example 5

A negative electrode and a secondary battery were obtained in the same manner as in Example 1 except that, in preparing the negative electrode slurry, the negative electrode active material, carboxymethyl cellulose (CMC), and styrene-butadiene rubber (SBR) were mixed together so as to attain a mass ratio of 98.6:0.6:0.8. The obtained negative electrode and secondary battery were used as Example 5.

Example 6

A negative electrode and a secondary battery were obtained in the same manner as in Example 1 except that, in preparing the negative electrode slurry, the negative electrode active material, carboxymethyl cellulose (CMC), and styrene-butadiene rubber (SBR) were mixed together so as to attain a mass ratio of 98.6:0.8:0.6. The obtained negative electrode and secondary battery were used as Example 6.

Comparative Example 1

A negative electrode and a secondary battery were obtained in the same manner as in Example 1 except that natural graphite D was used as the negative electrode active material. The obtained negative electrode and secondary battery were used as Comparative Example 1.

Comparative Example 2

A negative electrode and a secondary battery were obtained in the same manner as in Example 1 except that natural graphite E was used as the negative electrode active material. The obtained negative electrode and secondary battery were used as Comparative Example 2.

Comparative Example 3

A negative electrode and a secondary battery were obtained in the same manner as in Example 1 except that, in preparing the negative electrode slurry, the negative electrode active material, carboxymethyl cellulose (CMC), and styrene-butadiene rubber (SBR) were mixed together so as to attain a mass ratio of 99.2:0.6:0.2. The obtained negative electrode and secondary battery were used as Comparative Example 3.

Comparative Example 4

A negative electrode and a secondary battery were obtained in the same manner as in Example 1 except that, in preparing the negative electrode slurry, the negative electrode active material, carboxymethyl cellulose (CMC), and styrene-butadiene rubber (SBR) were mixed together so as to attain a mass ratio of 98.4:0.6:1.0. The obtained negative electrode and secondary battery were used as Comparative Example 4.

Comparative Example 5

A negative electrode and a secondary battery were obtained in the same manner as in Example 1 except that, in preparing the negative electrode slurry, the negative electrode active material, carboxymethyl cellulose (CMC), and styrene-butadiene rubber (SBR) were mixed together so as to attain a mass ratio of 99.0:0.8:0.2. The obtained negative electrode and secondary battery were used as Comparative Example 5.

Comparative Example 6

A negative electrode and a secondary battery were obtained in the same manner as in Example 1 except that, in preparing the negative electrode slurry, the negative electrode active material, carboxymethyl cellulose (CMC), and styrene-butadiene rubber (SBR) were mixed together so as to attain a mass ratio of 98.8:0.8:0.4. The obtained negative electrode and secondary battery were used as Comparative Example 6.

Comparative Example 7

A negative electrode and a secondary battery were obtained in the same manner as in Example 1 except that, in preparing the negative electrode slurry, the negative electrode active material, carboxymethyl cellulose (CMC), and styrene-butadiene rubber (SBR) were mixed together so as to attain a mass ratio of 98.4:0.8:0.8. The obtained negative electrode and secondary battery were used as Comparative Example 7.

Comparative Example 8

A negative electrode and a secondary battery were obtained in the same manner as in Example 1 except that, in preparing the negative electrode slurry, the negative electrode active material, carboxymethyl cellulose (CMC), and styrene-butadiene rubber (SBR) were mixed together so as to attain a mass ratio of 98.6:1.0:0.4. The obtained negative electrode and secondary battery were used as Comparative Example 8.

Comparative Example 9

A negative electrode and a secondary battery were obtained in the same manner as in Example 1 except that, in preparing the negative electrode slurry, the negative electrode active material, carboxymethyl cellulose (CMC), and styrene-butadiene rubber (SBR) were mixed together so as to attain a mass ratio of 98.4:1.0:0.6. The obtained negative electrode and secondary battery were used as Comparative Example 9.

Comparative Example 10

An attempt was made to obtain a negative electrode and a secondary battery in the same manner as in Example 1 except that, in preparing the negative electrode slurry, the negative electrode active material, carboxymethyl cellulose (CMC), and styrene-butadiene rubber (SBR) were mixed together so as to attain a mass ratio of 98.9:0.5:0.6. However, since dispersibility of the negative electrode slurry was degraded and the negative electrode mixture layer could not be formed, no negative electrode or secondary battery could be obtained. This result was used as Comparative Example 10.

Measurement of Liquid Absorption Time

Each of the negative electrodes of the Examples and Comparative Examples was dried for 10 hours in a nitrogen atmosphere in a thermostatic chamber heated to 200° C., and each negative electrode was cut to a size of 5 cm×5 cm to thereby produce a test piece. 3.0 µL of polypropylene carbonate (PC) was dropped vertically onto the surface of each test piece, and the time consumed until the PC was absorbed into the test piece was visually measured. For each test piece, six measurements were made, and the average value was used as the liquid absorption time. When the liquid absorption time is shorter, replacement of the electrolyte from the surface of the negative electrode mixture layer to the core material side occurs more smoothly, so that the electrolyte discharged from the negative electrode mixture layer during electric discharge is quickly absorbed by the negative electrode mixture layer during charging. Accordingly, when the liquid absorption time is shorter, the low-temperature regeneration characteristic is improved, and also degradation of the high-speed charge/discharge cycle characteristic is suppressed.

Measurement of Amount Dropped in Cutting

Each of the negative electrodes of the Examples and Comparative Examples was cut under the following conditions, and the amount dropped in cutting was determined based on an area occupied by the powder of the negative electrode mixture that dropped during cutting.

(1) A test piece was produced by cutting a negative electrode to a size of 100 mm×100 mm.

(2) The test piece was placed on a white paper. From an end of the test piece, a 100-mm segment was cut off using a cutter, and the negative electrode mixture was allowed to drop onto the white paper.

(3) An image of the dropped negative electrode mixture was captured using a stereomicroscope. The magnification of the stereomicroscope was 10×.

(4) The image obtained as described above was loaded into a computer and subjected to binarization using an image analysis software (for example, ImageJ manufactured by the US National Institutes of Health), to thereby obtain a binarized image in which the dropped negative electrode mixture was converted into black color and the white sheet was converted into white color.

(5) The area occupied by the dropped negative electrode mixture was calculated from the binarized image.

(6) The above steps (1) to (5) were performed 10 times, and the average value of the area occupied by the dropped negative electrode mixture was used as the amount dropped in cutting.

Evaluation of Low-Temperature Regeneration Characteristic

Each of the batteries of the Examples and Comparative Examples was charged under the following conditions, and a low-temperature regeneration value was obtained.

(1) Under the condition of 25° C., the battery was charged until the SOC reached 50%.

(2) The battery of 50% SOC was charged with currents of 3.7 It, 12.5 It, 17.5 It, 22.5 It, 31.2 It, and 37.5 It, respectively, for 5 seconds under the condition of −10° C. (It signifies It (A)=rated capacity (Ah)/1 (h)).

(3) The battery voltage immediately after each charging for 5 seconds was measured, and the battery voltage values were plotted against the respective current values to thereby determine a current value IP (A) that would achieve a battery voltage (V) equivalent to 100% SOC. The low-temperature regeneration value (W) was calculated by multiplying the battery voltage (V) equivalent to 100% SOC by the current value IP.

In Table 2, the results of the liquid absorption time, amount dropped in cutting, and low-temperature regeneration characteristic of the Examples and Comparative Examples are summarized. Table 2 also indicates each negative electrode active material used and the quantitative relationship ($C_{CMC}$, $C_{SBR}$, $C_{CMC}/C_{SBR}$, and $C_{CMC}+C_{SBR}$) between CMC and SBR in each negative electrode mixture layer.

TABLE 2

| | Composition | | | | | Evaluation Results | | |
| --- | --- | --- | --- | --- | --- | --- | --- | --- |
| | Negative Electrode Active Material | $C_{CMC}$ (mass %) | $C_{SBR}$ [mass %] | $C_{CMC}/C_{SBR}$ | $C_{CMC} + C_{SBR}$ [mass %] | Absorption Time [sec] | Amount Dropped in Cutting [mm²] | Low-Temperature Regeneration [W] |
| Example 1 | Natural Graphite A | 0.6 | 0.6 | 1.00 | 1.2 | 51.00 | 0.82 | 579.7 |
| Example 2 | Natural Graphite B | 0.6 | 0.6 | 1.00 | 1.2 | 52.00 | 0.76 | 577.4 |
| Example 3 | Natural Graphite C | 0.6 | 0.6 | 1.00 | 1.2 | 49.00 | 0.89 | 585.0 |
| Example 4 | Natural Graphite A | 0.6 | 0.4 | 1.50 | 1.0 | 49.00 | 1.49 | 586.0 |
| Example 5 | Natural Graphite A | 0.6 | 0.8 | 0.75 | 1.4 | 51.60 | 0.41 | 570.0 |

TABLE 2-continued

| | Composition | | | | Evaluation Results | | |
| Negative Electrode Active Material | $C_{CMC}$ (mass %) | $C_{SBR}$ [mass %] | $C_{CMC}/C_{SBR}$ | $C_{CMC} + C_{SBR}$ [mass %] | Absorption Time [sec] | Amount Dropped in Cutting [mm²] | Low-Temperature Regeneration [W] |
|---|---|---|---|---|---|---|---|
| Example 6 | Natural Graphite A | 0.8 | 0.6 | 1.33 | 1.4 | 51.00 | 1.97 | 574.0 |
| Comparative Example 1 | Natural Graphite D | 0.6 | 0.6 | 1.00 | 1.2 | 57.00 | 0.51 | 520.0 |
| Comparative Example 2 | Natural Graphite E | 0.6 | 0.6 | 1.00 | 1.2 | 46.00 | 5.40 | 587.0 |
| Comparative Example 3 | Natural Graphite A | 0.6 | 0.2 | 3.00 | 0.8 | 47.00 | 8.02 | 590.0 |
| Comparative Example 4 | Natural Graphite A | 0.6 | 1.0 | 0.60 | 1.6 | 48.00 | 0.48 | 544.0 |
| Comparative Example 5 | Natural Graphite A | 0.8 | 0.2 | 4.00 | 1.0 | 47.00 | 11.34 | 581.0 |
| Comparative Example 6 | Natural Graphite A | 0.8 | 0.4 | 2.00 | 1.2 | 50.00 | 8.00 | 572.0 |
| Comparative Example 7 | Natural Graphite A | 0.8 | 0.8 | 1.00 | 1.6 | 52.00 | 0.60 | 534.0 |
| Comparative Example 8 | Natural Graphite A | 1.0 | 0.4 | 2.50 | 1.4 | 50.00 | 9.54 | 568.0 |
| Comparative Example 9 | Natural Graphite A | 1.0 | 0.6 | 1.67 | 1.6 | 52.00 | 2.10 | 539.0 |
| Comparative Example 10 | Natural Graphite A | 0.5 | 0.6 | 0.83 | 1.1 | No Negative Electrode Could Be Produced | | |

As can be seen from Table 2, in each of Examples 1 to 5, the low-temperature regeneration characteristic could be maintained high while suppressing the mount dropped in cutting to a certain level or less, as compared to Comparative Examples 1 to 9.

REFERENCE SIGNS LIST

1 outer casing
2 sealing plate
3 electrode assembly
4 positive electrode core exposed portion
5 negative electrode core exposed portion
6 positive electrode current collector.
7 positive electrode terminal
8 negative electrode current collector.
9 negative electrode terminal
10 electrolyte injection port
11 gas discharge valve
13 positive electrode external conductive portion
14 positive electrode bolt portion
15 positive electrode insertion portion
16 negative electrode external conductive portion
17 negative electrode bolt portion
18 negative electrode insertion portion
100 secondary battery

The invention claimed is:

1. A non-aqueous electrolyte secondary battery, comprising: an electrode assembly having a positive electrode and a negative electrode; and an outer casing that houses the electrode assembly, wherein
the negative electrode includes a negative electrode core and a negative electrode mixture layer formed on a surface of the negative electrode core;
the negative electrode mixture layer contains a negative electrode active material having a tap density of 1.00 g/cm³ to 1.20 g/cm³, carboxy methyl cellulose (CMC) at a content of 0.6% by mass to 0.8% by mass in the negative electrode mixture layer, and styrene butadiene rubber (SBR) at a content of 0.4% by mass to 0.8% by mass in the negative electrode mixture layer;
a mass ratio of the CMC content to the SBR content in the negative electrode mixture layer is smaller than 2;
a total content of the CMC and the SBR in the negative electrode mixture layer is less than 1.5% by mass; and
wherein oil absorption of the negative electrode active material is 43 ml/100 g to 52 ml/100 g.

2. The non-aqueous electrolyte secondary battery according to claim 1, wherein a BET specific surface area of the negative electrode active material is 3.5 m²/g to 4.8 m²/g.

3. The non-aqueous electrolyte secondary battery according to claim 1, wherein the negative electrode active material has a substantially spherical shape having an average circularity of 0.8 or greater.

4. The non-aqueous electrolyte secondary battery according to claim 1, wherein an average particle size of the negative electrode active material is 8 μm to 13 μm.

5. The non-aqueous electrolyte secondary battery according to claim 1, wherein the negative electrode active material is natural graphite.

6. The non-aqueous electrolyte secondary battery according to claim 1, wherein Tg of the SBR is 5° C. or lower.

7. The non-aqueous electrolyte secondary battery according to claim 1, wherein a mass average molecular weight of the CMC is $3.7 \times 10^5$ to $4.3 \times 10^5$.

8. The non-aqueous electrolyte secondary battery according to claim 1, wherein
the electrode assembly is of a spiral type in which the positive electrode and the negative electrode are wound with separators located between the electrodes, and
the negative electrode mixture layer has a packing density of 1.05 g/cm³ to 1.25 g/cm³ and a thickness of 65 μm to 75 μm.

9. The non-aqueous electrolyte secondary battery according to claim 1, wherein the negative electrode mixture layer contains SBR at a content of 0.6% by mass to 0.8% by mass in the negative electrode mixture layer.

* * * * *